United States Patent
Blackburn

[11] Patent Number: 6,107,764
[45] Date of Patent: Aug. 22, 2000

[54] DRIVE CONTROL FOR A SWITCHED RELUCTANCE MOTOR

[75] Inventor: Scott Evart Blackburn, Temperance, Mich.

[73] Assignee: Dana Corporation, Toledo, Ohio

[21] Appl. No.: 09/182,986

[22] Filed: Oct. 30, 1998

[51] Int. Cl.[7] ............ H02K 23/00; H02P 1/18; H02P 3/08; H02P 5/06; H02P 7/06
[52] U.S. Cl. ............ 318/254; 318/661; 318/660; 318/700; 318/701; 318/601; 318/602; 388/815
[58] Field of Search ............ 388/815; 318/661, 318/600, 254, 700, 701, 601, 602

[56] References Cited

U.S. PATENT DOCUMENTS

| | | | |
|---|---|---|---|
| 4,494,051 | 1/1985 | Bailey | 318/254 |
| 4,629,980 | 12/1986 | Overby | 324/166 |
| 4,933,621 | 6/1990 | MacMinn et al. | 318/696 |
| 5,012,172 | 4/1991 | Sember | 318/696 |
| 5,038,088 | 8/1991 | Arends et al. | 318/565 |
| 5,086,492 | 2/1992 | Kent | 388/815 |
| 5,166,591 | 11/1992 | Stephens et al. | 318/701 |
| 5,313,149 | 5/1994 | Bahn | 318/727 |
| 5,350,988 | 9/1994 | Le | 318/618 |
| 5,619,113 | 4/1997 | Bahn | 318/701 |
| 5,757,596 | 5/1998 | Weber et al. | 361/23 |

*Primary Examiner*—Bentsu Ro
*Assistant Examiner*—Edgardo San Martin
*Attorney, Agent, or Firm*—Dykema Gossett PLLC

[57] ABSTRACT

A control circuit and method for controlling a switched reluctance motor are provided. The control circuit includes a tone wheel and a Hall effect sensor for generating a position feedback signal indicative of the position of the motor. The control circuit also includes a sensing resistor for generating a current feedback signal indicative of a level of current in a phase coil of the motor. Finally, the control circuit includes first and second switches connected to opposite ends of the phase coil for controlling the level of current in the phase coil responsive to the position feedback signal and the current feedback signal.

15 Claims, 3 Drawing Sheets

DRIVE CONTROL FOR A SWITCHED RELUCTANCE MOTOR

BACKGROUND OF THE INVENTION

1. Field of the Invention

This invention relates to a control circuit for a switched reluctance motor and, in particular, to a control circuit that uses discrete circuit components to control a motor that drives a relatively fixed load at a relatively fixed speed.

2. Disclosure of Related Art

A conventional switched reluctance motor (SRM) includes a stator having a plurality of pairs of diametrically opposed stator poles and a rotor having a plurality of pairs of diametrically opposed rotor poles. Windings or coils are typically disposed about the stator poles and the windings around any two diametrically opposed stator poles may be connected in series or in parallel to define one motor phase of the multiphase SRM. The windings associated with a motor phase may be referred to as a phase coil. By generating current through the phase coil, magnetic fields are established about the stator poles and a torque is produced that attracts a pair of rotor poles into alignment with the stator poles. The current in the phase coils is generated in a predetermined sequence in order to produce a constant torque on the rotor. The period during which current is provided to the phase coil—and the rotor poles are brought into alignment with the stator poles—is known as the "active stage" or conduction interval of the motor phase. At a certain point—either as the rotor poles become aligned with the stator poles or at some point prior thereto—it becomes desirable to commutate the current in the phase coil to prevent a negative or braking torque from acting on the rotor poles. Once this "commutation point" is reached, current is no longer generated in the phase coil and the current is allowed to dissipate from the phase coil. The period during which current is allowed to dissipate from the phase coil is known as the "inactive stage" of the motor phase.

A conventional control circuit for a switched reluctance motor incorporates a microprocessor which generates signals that are used to control the level of current in each motor phase coil. Microprocessors, however, are relatively expensive and are designed for applications in which the motor is used to drive loads of varying magnitude and at varying speeds. Microprocessors are also relatively complex, requiring relatively large amounts of time, money, and effort to develop and implement.

There is thus a need for a control circuit for a motor that will minimize or eliminate one or more of the above-mentioned deficiencies.

SUMMARY OF THE INVENTION

The present invention provides a control circuit and a method for controlling a motor such as a switched reluctance motor.

An object of the present invention is to provide a control circuit that uses discrete circuit components as opposed to a microprocessor.

Another object of the present invention is to provide a control circuit that is relatively inexpensive and less complex as compared to conventional control circuits.

A control circuit in accordance with the present invention includes means for generating a position feedback signal indicative of the position of the motor. The position feedback signal generating means may include a tone wheel mounted for rotation with either the shaft or rotor of the motor and a position sensor that generates the position feedback signal responsive to rotation of the tone wheel. The control circuit also includes means for generating a current feedback signal indicative of a level of current in a phase coil of the motor. The current feedback signal generating means may include a resistor connected in series with the phase coil. Finally, the control circuit includes means for controlling the level of current in the phase coil responsive to the position feedback signal and the current feedback signal. The controlling means may include first and second switches connected to opposite ends of the phase coil with one of the switches responsive to the position feedback signal and another of the switches responsive to both the position and current feedback signals.

A method for controlling a motor in accordance with the present invention includes the steps of generating a position feedback signal indicative of the position of the motor and generating a current feedback signal indicative of a level of current in a phase coil of the motor. The method also includes the step of controlling the level of current in the phase coil responsive to the position and current feedback signals.

A circuit and method in accordance with the present invention represent an improvement over conventional control circuits and methods because the inventive circuit and method may be implemented without the use of a microprocessor. As a result, the inventive circuit and method are less expensive and easier to implement than conventional control circuits and methods.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
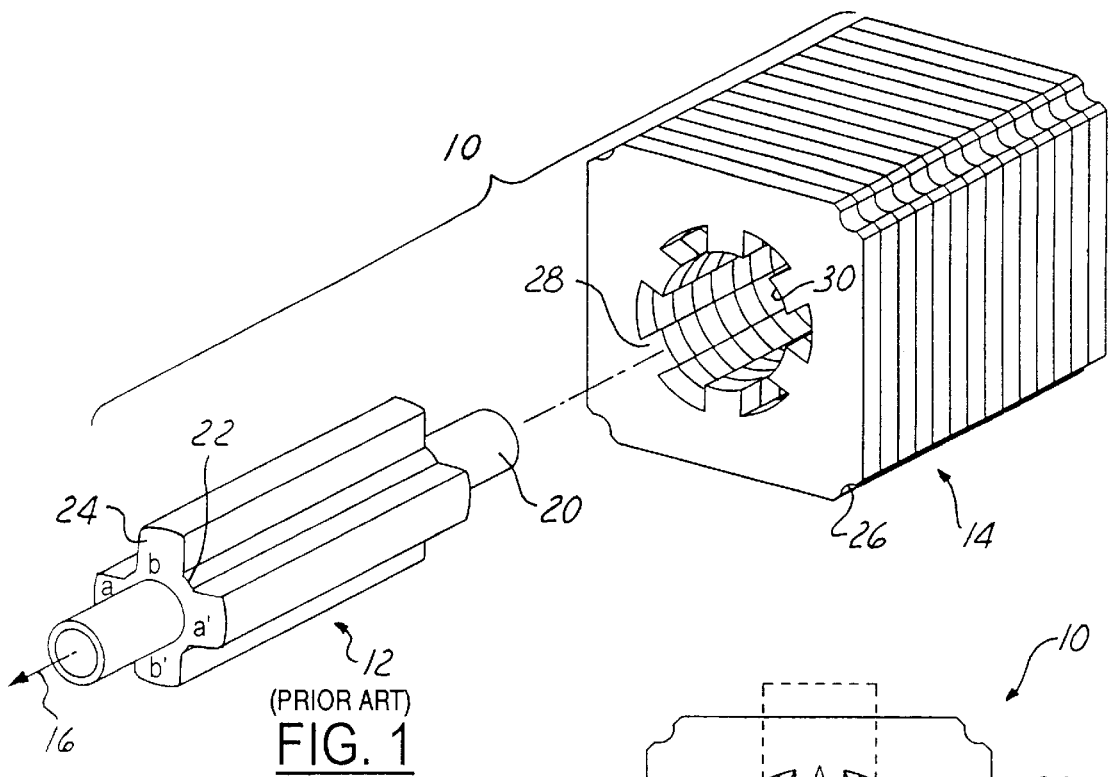
FIG. 1 is an exploded perspective view of a conventional switched reluctance motor.
Figure 2:
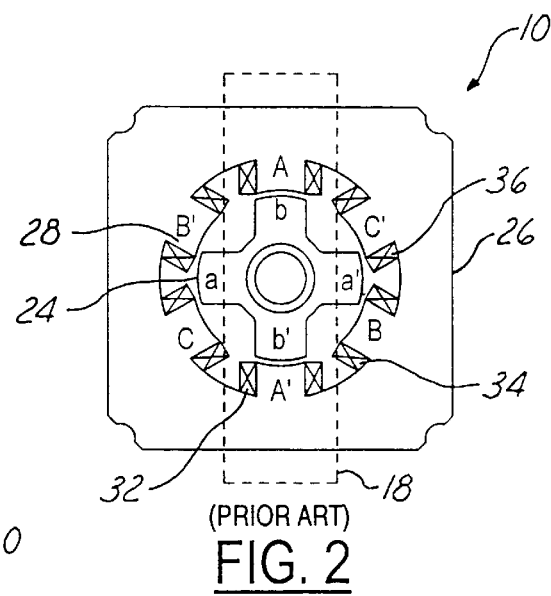
FIG. 2 is a cross-sectional view of a conventional switched reluctance motor.

Referring now to the drawings wherein like reference numerals are used to identify identical components in the various views, FIGS. 1 and 2 illustrate a conventional switched reluctance motor 10. Although the illustrated motor comprises a switched reluctance motor, it should be understood that the invention as disclosed herein could be applied to other motors as is known in the art. Motor 10 includes a rotor assembly 12 and a stator assembly 14, both of which may be centered about an axis 16. A representative motor phase 18 is indicated by a dashed-line box, while the other two motor phases are not shown. Although the illustrated embodiment includes three motor phases 18, it will be understood by those skilled in the art that the number of motor phases 18 may vary.

Rotor assembly 12 is provided to move a load (not shown) connected to rotor assembly 12. Assembly 12 includes a shaft 20 and a rotor 22 disposed about shaft 20. Shaft 20 is provided to engage either the load or another means for engaging the load. Shaft 20 extends longitudinally along axis 16 and may be centered about axis 16. Rotor 22 is provided to impart rotation to shaft 20 and is capable of clockwise or counter-clockwise rotation. Rotor 22 may be made from a material having a relatively low magnetic reluctance, such as iron. Rotor 22 may be centered about axis 16 and may include a spline or key (not shown) configured to be inserted within a keyway (not shown) in shaft 20. Rotor 22 includes a plurality of radially outwardly extending rotor poles 24 configured as diametrically opposed rotor pole pairs a–a', b–b'. Each of poles 24 is generally rectangular in cross-section and may include one or more radially outwardly extending teeth as is known in the art. It will be understood by those skilled in the art that the number of poles 24 of rotor 22 may vary.

Stator assembly 14 is provided produce a torque to cause rotation of rotor assembly 12. Stator assembly 14 may comprise a plurality of laminations 26 that are formed from a material, such as iron, having a relatively low magnetic reluctance. Assembly 14 includes a plurality of radially inwardly extending poles 28 configured as diametrically opposed stator pole pairs A–A', B–B', C–C'. Each pair of stator poles 28 is provided to attract a corresponding pair of rotor poles 24 of rotor assembly 12 and thereby cause rotation of rotor assembly 12. Poles 28 are generally rectangular in cross-section and may include one or more radially inwardly extending teeth (not shown) as is known in the art. Poles 28 may extend along the axial length of stator assembly 14 and define a bore 30 that is adapted to receive rotor assembly 12. It will be understood by those in the art that the number of stator poles 28 may vary.

Rotation of rotor assembly 12 is produced by initiating, and later commutating, in a predetermined sequence, conduction cycles in phase coils 32, 34, 36 surrounding each stator pole pair. Phase coils 32, 34, 36 are formed by connecting, in series or in parallel, windings on diametrically opposed stator poles 28. As one of phase coils 32, 34, 36 begins to conduct current, the nearest rotor pole pair is magnetically attracted towards the stator pole pair around which the energized phase coil is wound. By initiating and commutating conduction cycles in phase coils surrounding consecutive stator pole pairs, a relatively constant torque can be produced.

Figure 3:
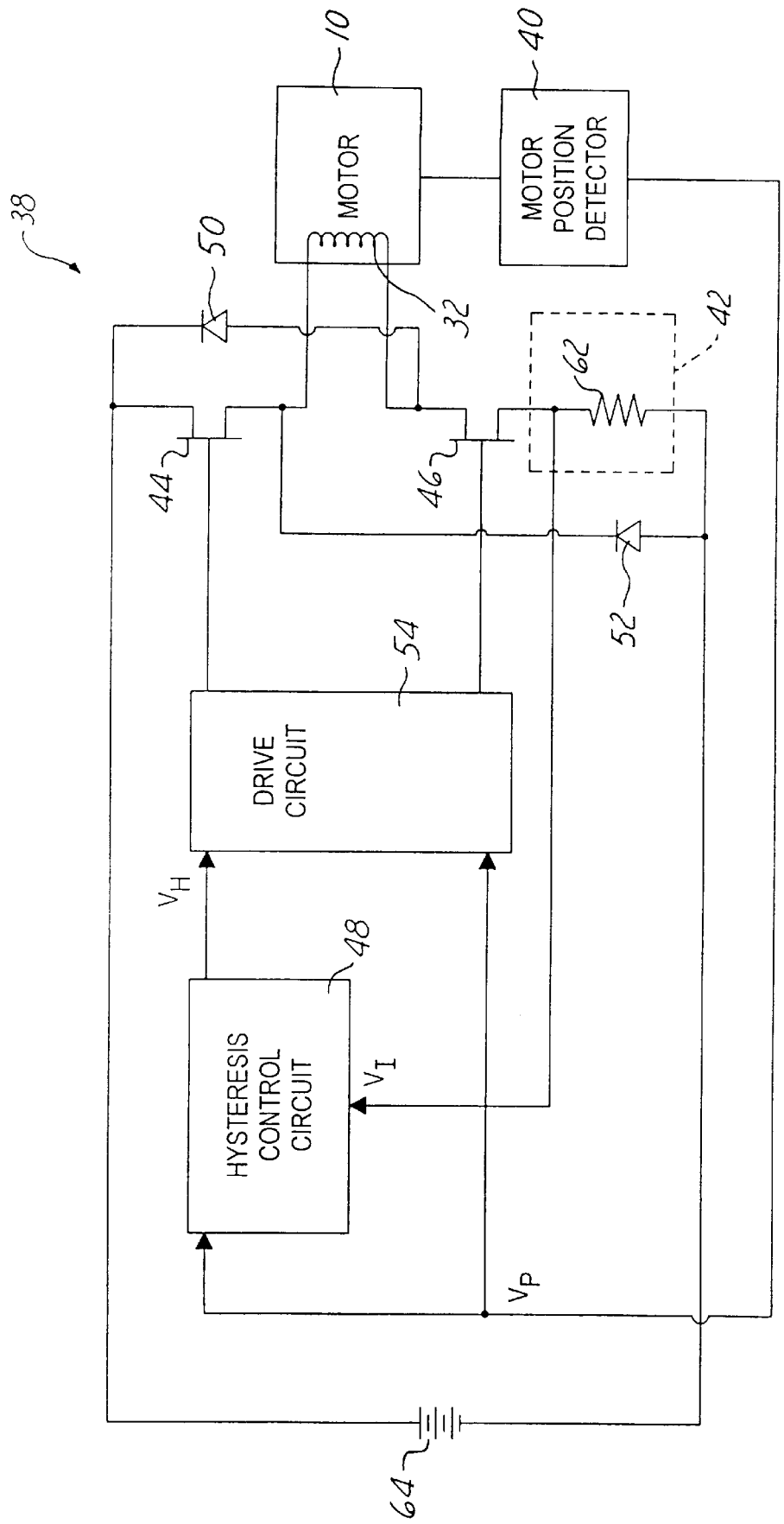
FIG. 3 is a combination schematic and block diagram illustrating a control circuit in accordance with the present invention.

Referring now to FIG. 3, a control circuit 38 for controlling motor 10 in accordance with the present invention is shown. Circuit 38 may include means, such as motor position detector 40, for generating a position feedback signal $V_P$ indicative of the position of motor 10. Circuit 38 may also include means, such as current sensor 42, for generating a current feedback signal $V_I$ indicative of a level of current in phase coil 32 of motor 10. Circuit 38 may also include means, such as switches 44, 46, for controlling the level of current in phase coil 32 responsive to position feedback signal $V_P$ and current feedback signal $V_I$. Circuit 38 may also include a hysteresis control circuit 48, diodes 50, 52 and a conventional drive circuit 54. Circuit 38 represents an equivalent circuit for one motor phase 18 of motor 10. It should be understood, however, that portions of circuit 38, such as position detector 40, may form a part of additional motor phases 18.

Figure 4:
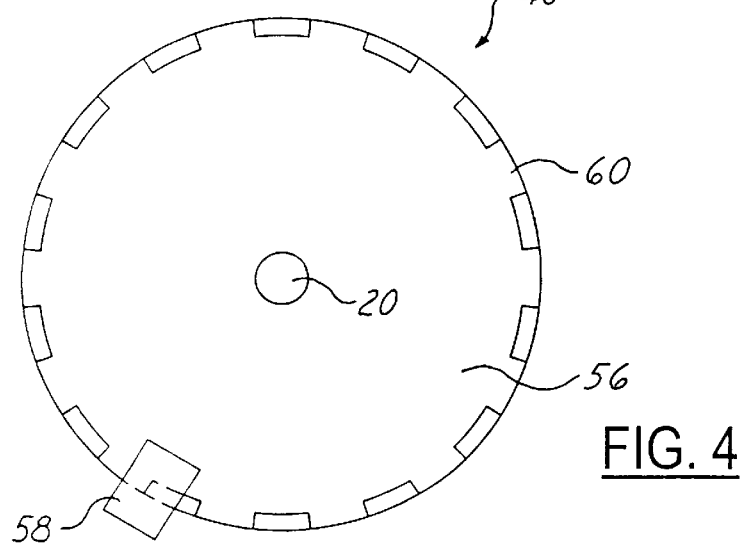
FIG. 4 is a diagrammatic representation of a motor position sensor portion of the circuit of FIG. 3.

Position detector 40 is provided to generate a position feedback signal $V_P$ indicative of the position of motor 10. Referring now to FIG. 4, position detector 40 may include a tone wheel 56 and a position sensor 58.

Tone wheel 56 is provided to control the state of sensor 58 in order to shape the conduction interval of each motor phase 18. Tone wheel 56 is conventional in the art. Tone wheel 56 may be mounted to a part of rotor assembly 12, such as shaft 20 or rotor 22, for rotation therewith. In the illustrated embodiment, tone wheel 56 includes fourteen (14) teeth 60 that extend radially outwardly. It should be understood, however, that the number, size, and shape of teeth 60 may be varied in order to vary the conduction intervals of the motor phases 18 and, therefore, optimize the conduction intervals for a given load and/or speed.

Position sensor 58 is provided to generate position feedback signal $V_P$ responsive to the position of tone wheel 56. Position sensor 58 is conventional in the art and may comprise a Hall effect sensor or an opto-interrupt sensor disposed proximate to the periphery of tone wheel 56. As teeth 60 of tone wheel 56 pass by position sensor 58, the state of position feedback signal $V_P$ varies between high and low logic levels.

Current sensor 42 is provided to generate a current feedback signal $V_I$ indicative of the level of current in phase coil 32. Current sensor 42 is conventional in the art. In the illustrated embodiment, current sensor 42 comprises a sensing resistor 62 connected in series with phase coil 32. It should be understood, however, that other conventional current sensors may also be used within circuit 38 including, for example, Hall effect current sensors.

Switches 44, 46, are provided to selectively couple a power supply 64 to phase coil 32 to energize and deenergize coil 32. Switches 44, 46, are conventional in the art and may take any of a plurality of forms well known in the art. For example, switches 44, 46, may comprise MOSFETs. Switch 44 is connected to a first end of coil 32 in series with coil 32. Switch 46 is connected to a second end of coil 32, also in series with coil 32. Switch 44 is directly responsive to a hysteresis control signal $V_H$ generated by hysteresis control circuit 48 and is indirectly responsive to position feedback signal $V_P$ and current feedback signal $V_I$. Switch 46 is directly responsive to position feedback signal $V_P$.

Hysteresis control circuit 48 is provided to control the level of current in phase coil 32 between a predetermined upper current level $I_H$ and a predetermined lower current level $I_L$ during the active stage of the conduction interval. Circuit 48 may take the form described and illustrated in commonly assigned U.S. patent application Ser. No. 09/094,803, the entire disclosure of which is hereby incorporated by reference. Circuit 48 generates hysteresis control signal $V_H$ responsive to position feedback signal $V_P$ and current feedback signal $V_I$.

Diodes 50, 52, are provided to control the dissipation of current from coil 32 and, in particular, to return the current in coil 32 to power supply 64. Diodes 50, 52, are conventional in the art. Diode 50 may be connected in parallel with the series combination of switch 44 and coil 32. Diode 52 may be connected in parallel with the series combination of switch 46, coil 32, and current sensor 42.

Drive circuit 54 is provided to adjust the voltage levels of hysteresis control signal $V_H$ and position feedback signal $V_P$ to account for different tolerances and requirements among the components of circuit 38. Drive circuit 54 is conventional in the art. It should be understood that drive circuit 54 may be omitted depending upon the tolerances and/or requirements of the components of circuit 38.

Figure 5A:
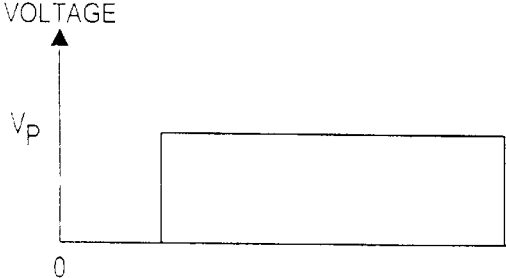
FIGS. 5A–D are timing diagrams illustrating voltage and current levels in the circuit of FIG. 3 over time.

Referring now to FIGS. 3, 4 and 5A–D, a method for controlling motor 10 in accordance with the present invention will be described. A method in accordance with the present invention may include the step of generating a position feedback signal $V_P$ indicative of the position of motor 10. This step may include the substeps of monitoring a change in the rotational or angular position of tone wheel 56 and outputting position feedback signal $V_P$ responsive to the change in position. As described hereinabove, tone wheel 56 rotates with rotor assembly 12 of motor 10. As tone wheel 56 rotates, its teeth 60 pass by position sensor 58 and alter the state of position feedback signal $V_P$ between predetermined high and low logic levels as shown in FIG. 5A.

Figure 5B:
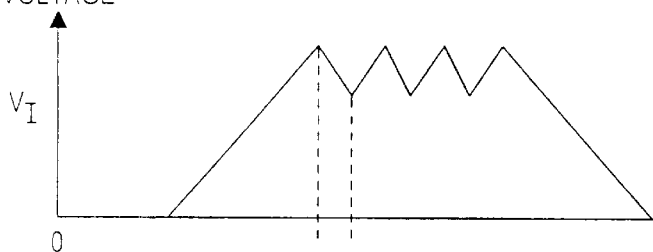
Figure 5C:
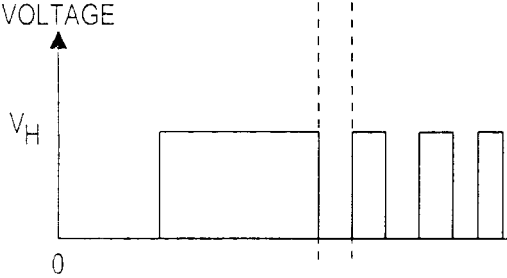
Figure 5D:
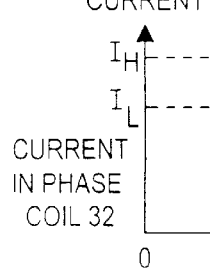

A method in accordance with the present invention may also include the step of generating a current feedback signal $V_I$ indicative of a level of current in phase coil 32. Referring to FIG. 3, a current sensor 42, such as resistor 62, is used to measure the current in phase coil 32 and to generate current feedback signal $V_I$. Referring now to FIGS. 5B and 5D, current indicative signal $V_I$ is shown to correspond to the level of current in phase coil 32.

A method in accordance with the present invention may finally include the step of controlling the level of current in phase coil 32 responsive to position feedback signal $V_P$ and current feedback signal $V_I$. This step may include the substeps of controlling switch 44 responsive to position feedback signal $V_P$ and current feedback signal $V_I$ and controlling switch 46 responsive to position feedback signal $V_P$. As shown in FIG. 3, position feedback signal $V_P$ may be supplied directly to switch 46. The substep of controlling switch 44, however, may include the further substeps of generating hysteresis control signal $V_H$ responsive to position and current feedback signals $V_P$, $V_I$, and controlling switch 44 responsive to hysteresis control signal $V_H$. As shown in FIG. 3, position and current feedback signals $V_P$, $V_I$, may be provided to hysteresis control circuit 48 which then generates hysteresis control signal $V_H$ in response. Hysteresis control signal $V_H$, shown in FIG. 5C, is then provided to switch 44 and the level of current in phase coil 32 is controlled between predetermined upper and lower current levels $I_H$, $I_L$ as shown in FIG. 5D.

A control circuit and method for controlling a motor in accordance with the present invention represent an improvement over conventional control circuits and methods—particularly, where the motor moves a relatively fixed load at a relatively fixed speed. The inventive circuit and method are implemented using discrete circuit components and do not rely on a microprocessor for motor control. As a result, the inventive circuit and method are less expensive and easier to implement as compared to conventional control circuits and methods.

While the invention has been particularly shown and described with reference to the preferred embodiments thereof, it is well understood by those skilled in the art that various changes and modifications can be made in the invention without departing from the spirit and scope of the invention.

I claim:

1. A control circuit for a motor, comprising:
   a motor position detector that generates a position feedback signal indicative of a position of said motor;
   a current sensor that generates a current feedback signal indicative of a level of current in a phase coil of said motor;
   a first switch connected to a first end of said phase coil and responsive only to said position feedback signal; and
   a second switch connected to a second end of said phase coil and responsive to said position feedback signal and said current feedback signal.

2. The control circuit of claim 1 wherein said motor position detector includes:
   a tone wheel mounted to one of a shaft and a rotor of said motor for rotation therewith; and,
   a position sensor that generates said position feedback signal responsive to rotation of said tone wheel.

3. The control circuit of claim 2 wherein said position sensor comprises a Hall effect sensor.

4. The control circuit of claim 2 wherein said position sensor comprises an opto-interrupt sensor.

5. The control circuit of claim 1 wherein said current sensor comprises a resistor connected in series with said phase coil.

6. The control circuit of claim 1, further comprising a hysteresis control circuit that controls said second switch responsive to said position feedback signal and said current feedback signal.

7. A control circuit for a motor, comprising:
   means for generating a position feedback signal indicative of a position of said motor;
   means for generating a current feedback signal indicative of a level of current in a phase coil of said motor;
   a first switch connected to a first end of said phase coil and responsive only to said position feedback signal; and,
   a second switch connected to a second end of said phase coil and responsive to said position feedback signal and said current feedback signal.

8. The control circuit of claim 7 wherein said position feedback signal generating means includes
   a tone wheel mounted to one of a shaft and a rotor of said motor for rotation therewith; and,
   a position sensor that generates said position feedback signal responsive to rotation of said tone wheel.

9. The control circuit of claim 8 wherein said position sensor comprises a Hall effect sensor.

10. The control circuit of claim 8 wherein said position sensor comprises an opto-interrupt sensor.

11. The control circuit of claim 7 wherein said current feedback signal generating means includes a resistor connected in series with said phase coil.

12. The control circuit of claim 7, further comprising a hysteresis control circuit that controls said second switch responsive to said position feedback signal and said current feedback signal.

13. A method for controlling a motor, comprising the steps of:
   generating a position feedback signal indicative of a position of said motor;
   generating a current feedback signal indicative of a level of current in a phase coil of said motor;
   controlling a first switch connected to a first end of said phase coil responsive to only said position feedback signal; and,
   controlling a second switch connected to a second end of said phase coil responsive to said position feedback signal and said current feedback signal.

14. The method of claim 13 wherein said position feedback signal generating step includes the substeps of:
   monitoring a change in position of a tone wheel mounted to one of a shaft and a rotor of said motor for rotation therewith; and
   outputting said position feedback signal responsive to said change in position of said tone wheel.

15. The method of claim 13 wherein said substep of controlling a second switch includes the substeps of:
   generating a hysteresis control signal responsive to said position feedback signal and said current feedback signal; and,
   controlling said second switch responsive to said hysteresis control signal.

* * * * *